US011323167B2

(12) United States Patent
Chiu et al.

(10) Patent No.: US 11,323,167 B2
(45) Date of Patent: May 3, 2022

(54) COMMUNICATION TIME ALLOCATION METHOD USING REINFORCEMENT LEARNING FOR WIRELESS POWERED COMMUNICATION NETWORK AND BASE STATION

(71) Applicant: National Tsing Hua University, Hsinchu (TW)

(72) Inventors: Wei-Yu Chiu, Hsinchu (TW); Sung-Yu Tsai, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 200 days.

(21) Appl. No.: 16/894,894

(22) Filed: Jun. 8, 2020

(65) Prior Publication Data

US 2021/0320706 A1  Oct. 14, 2021

(30) Foreign Application Priority Data

Apr. 13, 2020 (TW) .................. 109112410

(51) Int. Cl.
*H04B 7/06* (2006.01)
*H04B 7/0426* (2017.01)
(Continued)

(52) U.S. Cl.
CPC .......... *H04B 7/0634* (2013.01); *G06N 20/00* (2019.01); *H04B 7/0417* (2013.01); *H04B 7/0426* (2013.01); *H04L 5/0082* (2013.01)

(58) Field of Classification Search
CPC .. H04B 7/0417; H04B 7/0426; H04B 7/0434; H04B 7/0634; H04L 5/0082
See application file for complete search history.

(56) References Cited

U.S. PATENT DOCUMENTS 9,020,518 B2 * 4/2015 Huang .................. H04L 1/0029
370/335
9,369,888 B2 * 6/2016 Forenza ............... H04B 7/0456
(Continued)

FOREIGN PATENT DOCUMENTS

CN 106793042 A 5/2017
CN 109121221 1/2019
(Continued)

OTHER PUBLICATIONS

Richard S. Sutton, et al., "Reinforcement Learning: An Introduction", The MIT Press, Jan. 1, 2018, pp. i-426.
(Continued)

*Primary Examiner* — Oussama Roudani
(74) *Attorney, Agent, or Firm* — JCIPRNET (57) ABSTRACT

The disclosure provides a communication time allocation method using reinforcement learning for a wireless powered communication network and a base station. The method includes: determining a communication time allocation corresponding to the t-th time block according to an objective function associated with the total estimated throughput of the communication nodes; requesting each communication node to perform specific communication behaviors according to the corresponding communication time interval in the t-th time block; obtaining the actual throughput of each communication node in the t-th time block; generating the weight vector of each communication node in the (t+1)-th time block according to the actual throughput, the weight vector, and the estimated throughput of each communication node in the t-th time block.

15 Claims, 6 Drawing Sheets

(51) Int. Cl.
  *G06N 20/00* (2019.01)
  *H04L 5/00* (2006.01)
  *H04B 7/0417* (2017.01)

(56) References Cited

U.S. PATENT DOCUMENTS 10,349,332 B2 * 7/2019 Agee .................. H04L 5/0007
11,070,258 B2 * 7/2021 Perlman .............. H04B 7/0626

FOREIGN PATENT DOCUMENTS

| CN | 109168178 | 1/2019 | | |
|---|---|---|---|---|
| CN | 109272167 A | 1/2019 | | |
| CN | 106973440 | 6/2019 | | |
| WO | WO-2013087036 A1 * | 6/2013 | ........... | H04B 7/0417 |

OTHER PUBLICATIONS

Ping Shen, et al., "The Co-estimation of State of Charge, State of Health, and State of Function for Lithium-Ion Batteries in Electric Vehicles", IEEE Trans. Veh. Technol., vol. 67, No. 1, Jan. 2018, pp. 92-103.

* cited by examiner

FIG. 1

$$\tau_{0,1}(t) = \tau_{0,2}(t) = \ldots \tau_{0,N}(t) = \tau_H(t)$$
$$\tau_T(t) = \tau_1(t) + \ldots + \tau_N(t)$$

FIG. 2A

FIG. 2B $$\tau_{0,1}(t) = \tau_H(t)$$
$$\tau_{0,n}(t) = \tau_H(t) + \sum_{j=1}^{n-1} \tau_j(t), n=2,\ldots,N$$
$$\tau_T(t) = \tau_1(t) + \ldots + \tau_N(t)$$

FIG. 2C $$\tau_{0,n}(t) = \tau_H(t) + \sum_{\substack{j=1 \\ j \neq n}}^{N} \tau_j(t)$$
$$\tau_T(t) = \tau_1(t) + \ldots + \tau_N(t)$$

FIG. 2D $\tau_{0,1}(t) = \tau_{0,2}(t) = \ldots \tau_{0,N}(t) = \tau_H(t)$ $\tau_T(t) = \ldots = \tau_N(t) = \tau_T(t)$

FIG. 3

COMMUNICATION TIME ALLOCATION METHOD USING REINFORCEMENT LEARNING FOR WIRELESS POWERED COMMUNICATION NETWORK AND BASE STATION

CROSS-REFERENCE TO RELATED APPLICATION

This application claims the priority benefit of Taiwan application serial no. 109112410, filed on Apr. 13, 2020. The entirety of the above-mentioned patent application is hereby incorporated by reference herein and made a part of this specification.

BACKGROUND

1. Technical Field

The disclosure relates to a communication time allocation method, in particular, to a communication time allocation method using reinforcement learning for a wireless powered communication network (WPCN) and a base station.

2. Description of Related Art

For conventional wireless powered communication networks (WPCNs), transmission throughput optimization is mostly converted into convex problems solved by convex optimization algorithms or directly solved using Lagrange multiplier. These methods require the knowledge of models (such as the specific form of a throughput function)

However, a specific model may not be known and some parameters of the model would vary with time. Therefore, if the communication times of the base station and the communication nodes cannot be dynamically adjusted, the total throughput of the WPCN might be significantly reduced.

SUMMARY

The disclosure provides a communication time allocation method using reinforcement learning for a wireless powered communication network and a base station, which can solve the above-mentioned problems.

An embodiment of the disclosure provides a communication time allocation method using reinforcement learning for a base station of a wireless powered communication network. The base station manages a plurality of communication nodes of the wireless powered communication network. The communication time allocation method includes obtaining a weight vector of each of the plurality of communication nodes in a t-th time block, and modeling an eigenvector of each of the plurality of communication nodes in the t-th time block, wherein the eigenvector of each of the plurality of communication nodes in the t-th time block is associated with a communication time interval of each of the plurality of communication nodes in the t-th time block; modeling an estimated throughput of each of the plurality of communication nodes in the t-th time block according to the weight vector and the eigenvector of each of the plurality of communication nodes in the t-th time block, and accordingly modeling a total estimated throughput of the plurality of communication nodes in the t-th time block; determining a communication time allocation corresponding to the t-th time block according to an objective function associated with the total estimated throughput, wherein the communication time allocation comprises the communication time intervals of each of the base station and the plurality of communication nodes in the t-th time block, and the communication time allocation satisfies at least one limitation condition; notifying the plurality of communication nodes of the communication time allocation of the t-th time block, and requesting each of the plurality communication nodes to perform a specific communication behavior according to the corresponding communication time interval in the t-th time block; obtaining an actual throughput of each of the plurality of communication nodes in the t-th time block; and generating the weight vector of each of the plurality of communication nodes in a (t+1)-th time block according to the actual throughput, the weight vector and the estimated throughput of each of the plurality of communication nodes in the t-th time block.

An embodiment of the disclosure provides a base station belonging to a wireless powered communication network and managing a plurality of communication nodes of the wireless powered communication network. The base station is configured to: obtain a weight vector of each of the plurality of communication nodes in a t-th time block, and model an eigenvector of each of the plurality of communication nodes in the t-th time block, wherein the eigenvector of each of the plurality of communication nodes in the t-th time block is associated with a communication time interval of each of the plurality of communication nodes in the t-th time block; model an estimated throughput of each of the plurality of communication nodes in the t-th time block according to the weight vector and the eigenvector of each of the plurality of communication nodes in the t-th time block, and accordingly model a total estimated throughput of the plurality of communication nodes in the t-th time block; determine a communication time allocation corresponding to the t-th time block according to an objective function associated with the total estimated throughput, wherein the communication time allocation comprises the communication time intervals of each of the base station and the plurality of communication nodes in the t-th time block, and the communication time allocation satisfies at least one limitation condition; notify the plurality of communication nodes of the communication time allocation of the t-th time block, and request each of the plurality communication nodes to perform a specific communication behavior according to the corresponding communication time interval in the t-th time block; obtain an actual throughput of each of the plurality of communication nodes in the t-th time block; and generate the weight vector of each of the plurality of communication nodes in a (t+1)-th time block according to the actual throughput, the weight vector and the estimated throughput of each of the plurality of communication nodes in the t-th time block.

In order to make the aforementioned and other objectives and advantages of the disclosure comprehensible, embodiments accompanied with figures are described in detail below.

DESCRIPTION OF THE EMBODIMENTS

Figure 1:
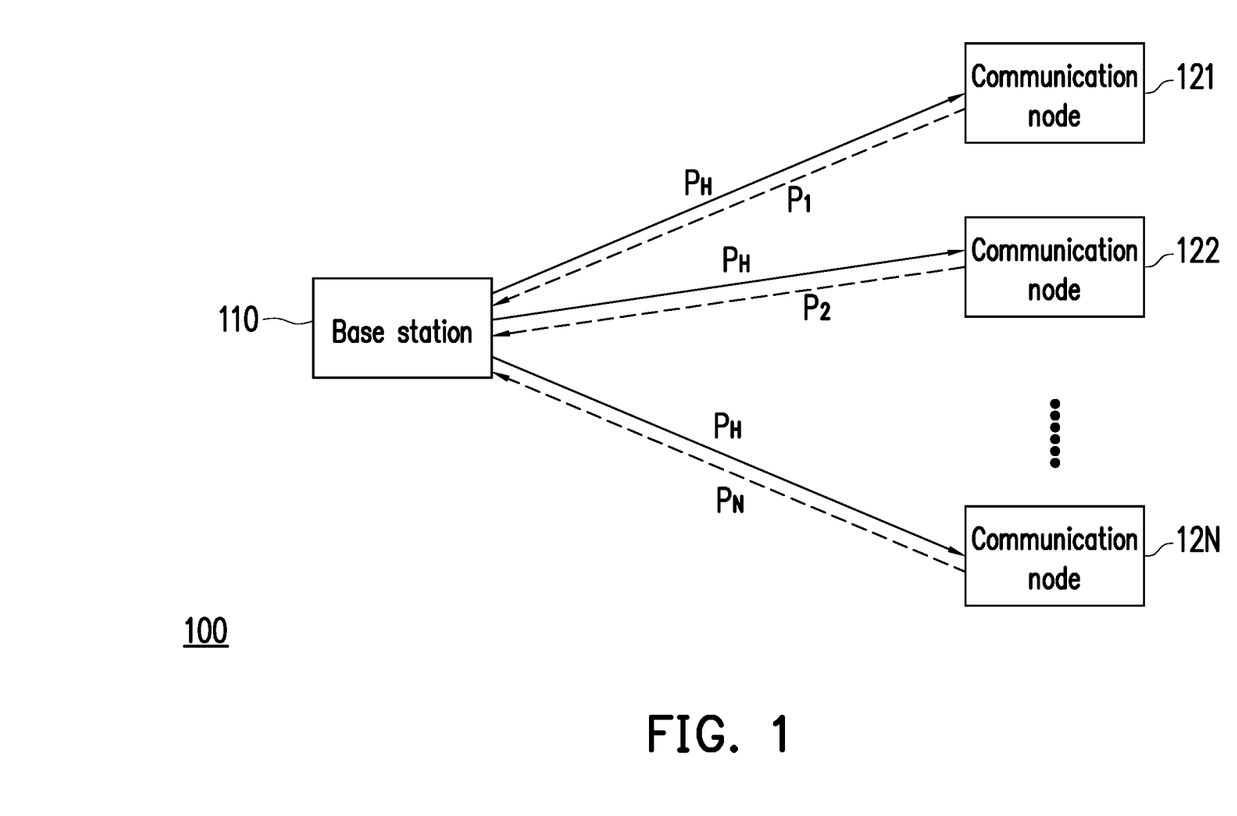
FIG. 1 is a schematic diagram of a wireless powered communication network (WPCN) system according to an embodiment of the disclosure.

Please refer to FIG. 1, which is a schematic diagram of a wireless powered communication network (WPCN) system according to an embodiment of the disclosure. As illustrated in FIG. 1, the WPCN system includes a base station 110 and multiple communication nodes 121-12N (N denotes a total number of the communication nodes). The base station 110 may be utilized for managing the communication nodes 121-12N. In some embodiments, the base station 110 may be utilized for (simultaneously) transferring energy $P_H$ to the communication nodes 121-12N, so as to charge the communication nodes 121-12N. In addition, the communication nodes 121-12N may respectively send data $P_1$-$P_N$ to the base station 110 in allocated communication time intervals. However, the disclosure is not limited to the above.

According to an embodiment of the disclosure, the WPCN system 100 is assumed to operate based upon a harvest-then-transmit protocol. That is, in a time block, the base station 110 first charges the communication nodes 121-12N (i.e., energy harvest), and then the communication nodes 121-12N send data to the base station 110 within the corresponding communication time intervals. For ease of explanation, the communication time interval in which the base station 110 charges the communication nodes 121-12N in the t-th time block is denoted as $\tau_H(t)$ (which is greater than or equal to 0), and a total transmission time occupied by the communication nodes 121-12N in the t-th time block is expressed as $\tau_T(t)$. In addition, a sum of $\tau_H(t)$ and $\tau_T(t)$ is assumed to be the length of a time block. According to an embodiment, the length of a time block is assumed to be 1 (i.e., $\tau_H(t)+\tau_T(t)=1$) for ease of explanation. However, the disclosure is not limited to the above.

In addition, a time for which the n-th communication node (12n hereinafter) of the communication nodes 121-12N obtains energy from the base station 110 (i.e., charged by the base station 110) in the t-th time block is denoted by $\tau_{o,n}(t)$, while a communication time interval of the communication node 12n in the t-th time block is denoted by $\tau_n(t)$.

Among different embodiments, the types of $\tau_H(t)$, $\tau_T(t)$, $\tau_{o,n}(t)$ and $\tau_n(t)$ vary with the configuration of the WPCN system 100, and will be further described in the following with reference to FIGS. 2A to 2D.

Figure 2A:
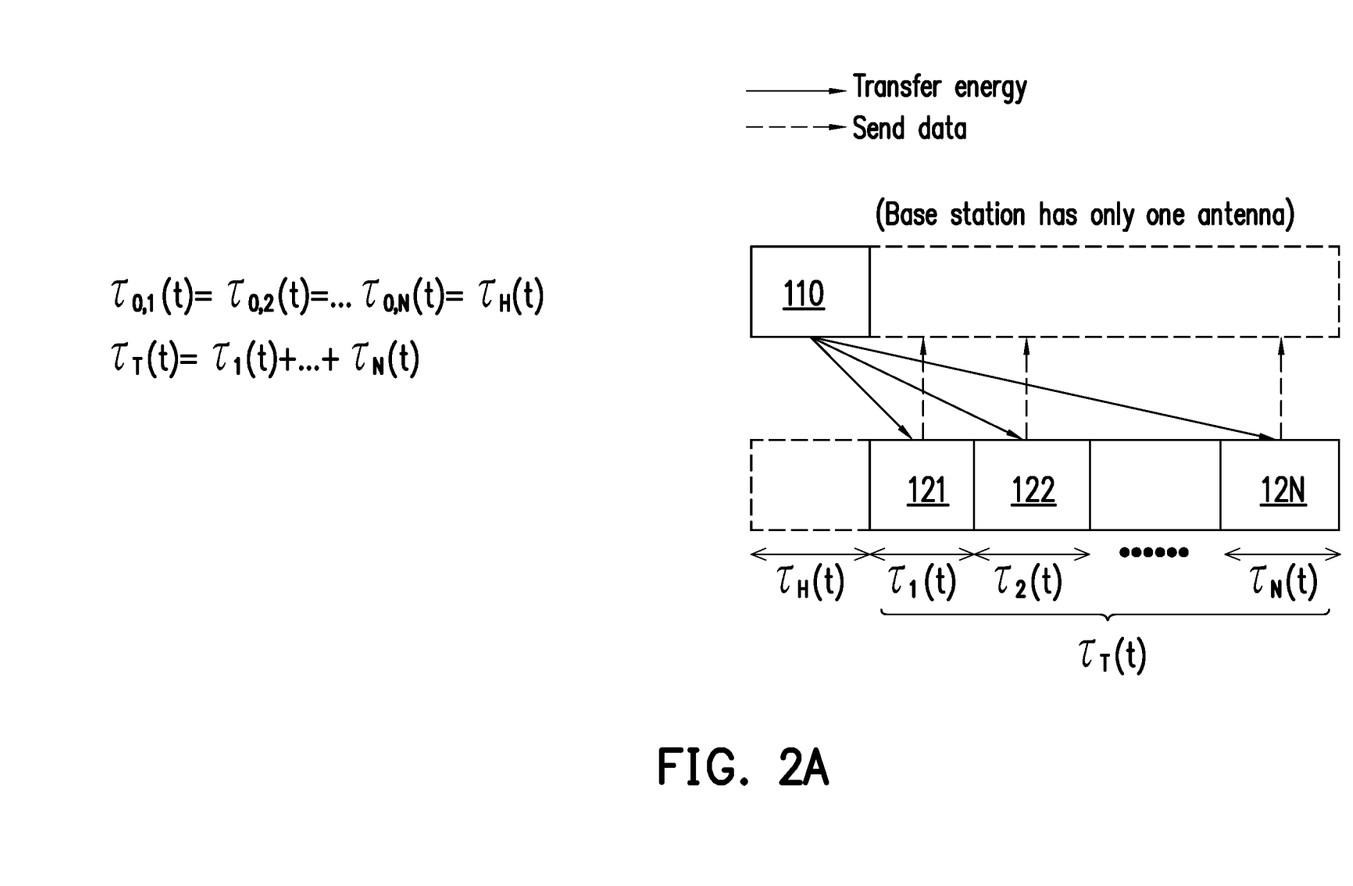
FIG. 2A is a schematic diagram of a WPCN system according to a first embodiment of the disclosure.

Please refer to FIG. 2A, which is a schematic diagram of a WPCN system according to a first embodiment of the disclosure. According to the first embodiment, the base station 110 is assumed to have only one antenna, such that the base station 110 may either transfer energy or receive data from one of the communication nodes 121-12N. In addition, the t-th time block is assumed to be evenly distributed to the base station 110 and the communication nodes 121-12N, such that $\tau_{o,1}(t)$-$\tau_{o,N}(t)$ of the communication nodes 121-12N and $\tau_H(t)$ of the base station 110 are equal, and $\tau_T(t)$ may be the sum of $\tau_1(t)$-$\tau_N(t)$, as illustrated in FIG. 2A.

Figure 2B:
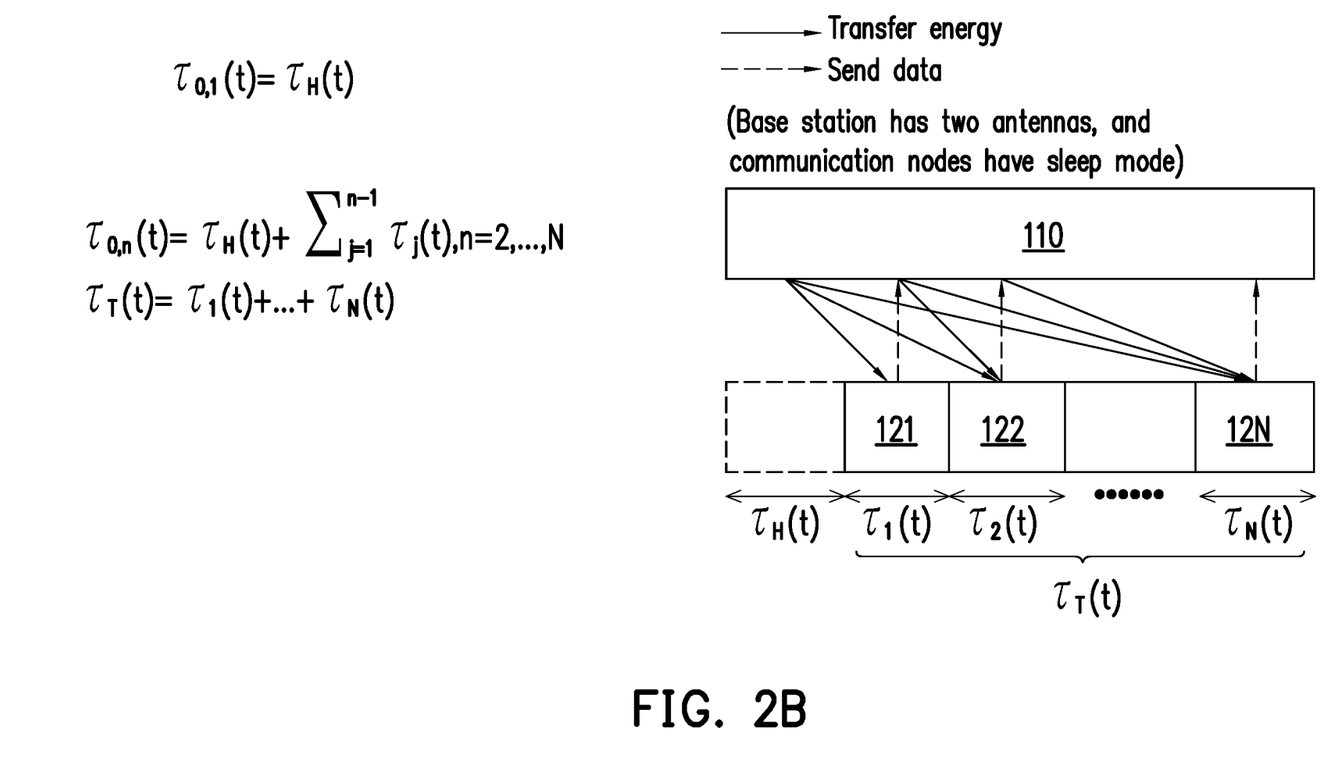
FIG. 2B is a schematic diagram of a WPCN system according to a second embodiment of the disclosure.

Please refer to FIG. 2B, which is a schematic diagram of a WPCN system according to a second embodiment of the disclosure. According to the second embodiment, the base station 110 is assumed to have two antennas. That is, the base station 110 may simultaneously transfer energy to the communication nodes 121-12N and receive data from one of the communication nodes 121-12N respectively via the two antennas.

Moreover, the communication nodes 121-12N are assumed to have a sleep mode. As such, the communication node 12n will no longer obtain energy from the base station 110 after the corresponding $\tau_{o,n}(t)$. Therefore, $\tau_{o,1}(t)$ corresponding to the communication node 121 is equivalent to $\tau_H(t)$, while $\tau_{o,n}(t)$ corresponding to another communication node 12n may be expressed as $\tau_H(t)+\Sigma_{j=1}^{n-1}\tau_j(t)$. In addition, $\tau_T(t)$ may still be the sum of $\tau_1(t)$-$\tau_N(t)$, as illustrated in FIG. 2B.

Figure 2C:
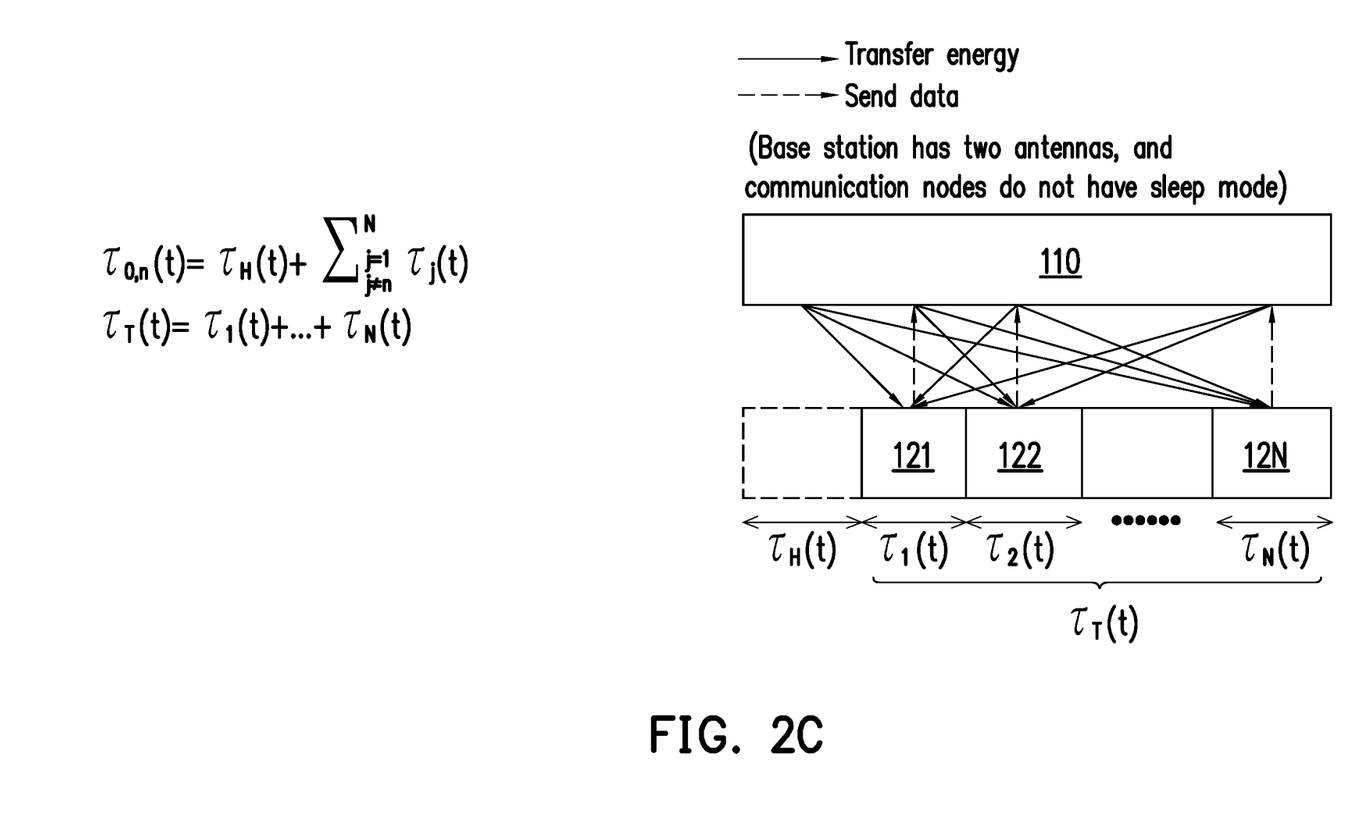
FIG. 2C is a schematic diagram of a WPCN system according to a third embodiment of the disclosure.

Please refer to FIG. 2C, which is a schematic diagram of a WPCN system according to a third embodiment of the disclosure. The only difference between the second and third embodiments is that none of the communication nodes 121-12N of the third embodiment has a sleep mode. That is, the communication node 12n will still obtain energy from the base station 110 after the corresponding $\tau_{o,n}(t)$. Therefore, $\tau_{o,n}(t)$ corresponding to the communication node 12n may be expressed as $$\tau_H(t) + \sum_{\substack{j=1 \\ j \neq n}}^{N} \tau_j(t).$$

In addition, $\tau_T(t)$ may still be the sum of $\tau_1(t)$-$\tau_N(t)$, as illustrated in FIG. 2C.

Figure 2D:
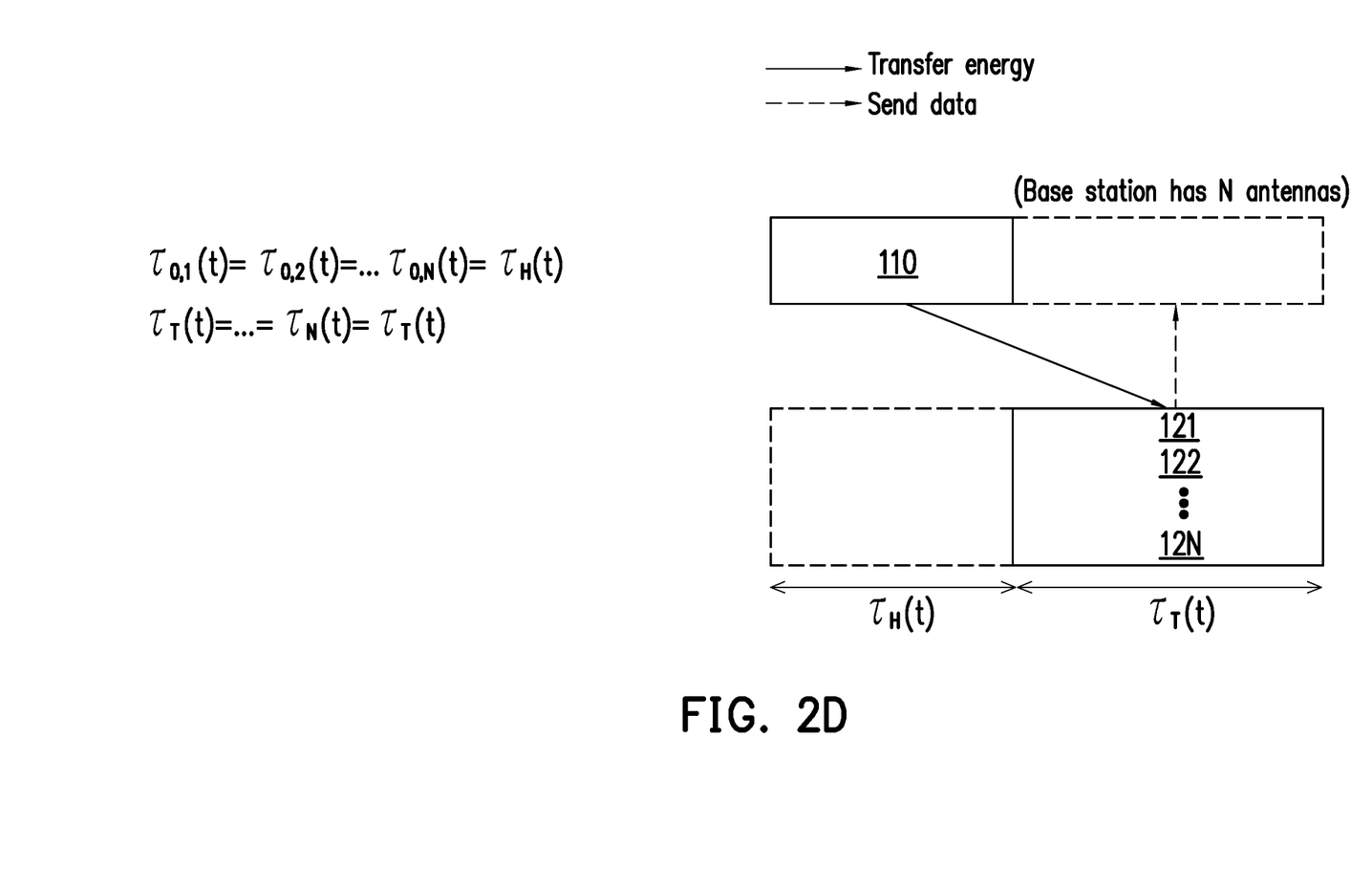
FIG. 2D is a schematic diagram of a WPCN system according to a fourth embodiment of the disclosure.

Please refer to FIG. 2D, which is a schematic diagram of a WPCN system according to a fourth embodiment of the disclosure. According to the fourth embodiment, the base station 110 is assumed to have N antennas. That is, the base station 110 may simultaneously receive data from the communication nodes 121-12N. In such a situation, $\tau_{o,1}(t)$-$\tau_{o,N}(t)$ of the communication nodes 121-12N and $\tau_H(t)$ of the base station 110 may be equal, and $\tau_1(t)$-$\tau_N(t)$ and $\tau_T(t)$ may also be equal, as illustrated in FIG. 2D.

According to the conventional technology, if the optimal communication time allocation (i.e., communication time intervals of the base station 110 and the communication nodes 121-12N in the t-th time block, which may be characterized as $\tau(t)=[\tau_H(t) \ \tau_1(t) \ \ldots \ \tau_N(t)]$) of the base station 110 and the communication nodes 121-12N in the t-th time block is to be obtained, different algorithms and known models are required for the WPCN systems of the first to fourth embodiments discussed in the above. That is, a single algorithm cannot be employed for the WPCN systems of all of the first to fourth embodiments.

In comparison, the method of the disclosure may find out the optimal communication time allocation (i.e., $\tau(t)$) of the base station 110 and the communication nodes 121-12N in the t-th time block while the models are unknown, and may be widely employed to all of the WPCN systems of the first to fourth embodiments. The method of the disclosure will be further described below.

Figure 3:
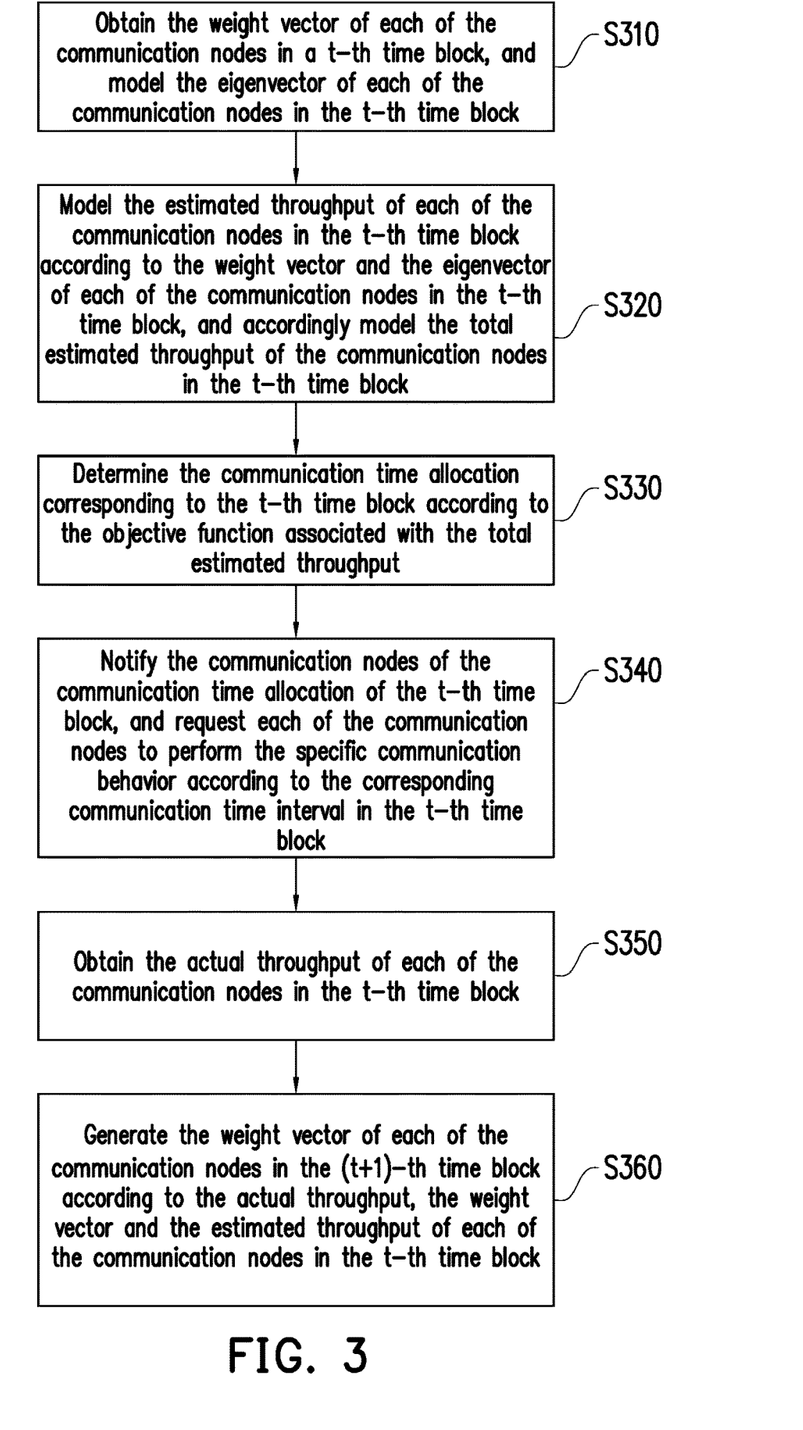
FIG. 3 is a flowchart of a communication time allocation method using reinforcement learning for WPCNs according to an embodiment of the disclosure.

Please refer to FIG. 3, which is a flowchart of a communication time allocation method for WPCN according to an embodiment of the disclosure. The method of this embodiment may be performed by the base station 110 of FIG. 1, and the details of each step of FIG. 3 will be explained below with reference to the components shown in FIG. 1.

First, in the step S310, the base station 110 may obtain the weight vector of each of the communication nodes 121-12N in the t-th time block, and model the eigenvector of each of the communication nodes 121-12N in the t-th time block.

According to an embodiment, the weight vector and eigenvector of the communication node 12n in the t-th time block may be respectively denoted as $w_n(t)$ and $x_n(t)$, wherein $x_n(t)$ may be associated with the communication time interval of the communication node 12n in the t-th time block.

According to an embodiment, $w_n(t)=[w_{n,1}(t)\ w_{n,2}(t), \ldots w_{n,D}]$, and $x_n(t)=[x_1(\tau_H(t), \tau_n(t)) \ldots x_D(\tau_H(t), \tau_n(t))]$, in which D denotes a dimension of $w_n(t)$ and $x_n(t)$. For details of the step S310 of the disclosure, please refer to the relevant technical literature (e.g., "R. S. Sutton and A. G. Barto, *Reinforcement Learning: An Introduction*, 2nd ed. Cambridge, Mass., London, England: MIT Press, 2018"), and details are not further described herein.

In short, according to the embodiment of the disclosure, $w_n(t)$ may be obtained by updating $w_n(t-1)$, and details of the updating mechanism will be described below. In addition, $w_n(1)$ corresponding to the first time block may be generated based upon a specific concern of a designer (such as stochastic generation, etc.). However, the disclosure is not limited to the above.

In the next step S320, the base station 110 may model an estimated throughput of each of the communication nodes 121-12N in the t-th time block according to the weight vector and the eigenvector of each of the communication nodes 121-12N in the t-th time block, and accordingly model a total estimated throughput of the communication nodes 121-12N in the t-th time block.

According to an embodiment, the estimated throughput of each of the communication nodes 121-12N in the t-th time block may be denoted as $\hat{R}_n(t)$ and be modeled as $\hat{R}_n(t)=w_n(t)x_n^T=\hat{R}_n(\tau_H(t), \tau_n(t), w_n(t))=\Sigma_{d=1}^{D} w_{n,d}(t)x_d(\tau_H(t), \tau_n(t))$. In addition, the total estimated throughput of the communication nodes 121-12N in the t-th time block may be denoted as $\hat{R}(t)$ and modeled as $\hat{R}(t)=\Sigma_{n=1}^{N}\hat{R}_n(t)$. However, the disclosure is not limited to the above.

According other embodiments, the total estimated throughput (i.e., $\hat{R}(t)$) may be modeled in different ways based upon needs of the designer. For example, according to the conventional literatures of WPCN, the battery lives of the communication nodes 121-12N are not considered, but the entire WPCN will stop operating when the battery lives end. Therefore, if the designer wants to make the determined $\tau(t)$ capable of further considering and extending the battery lives of the communication nodes 121-12N, $\hat{R}(t)$ may be accordingly adjusted as $\hat{R}(t)=\Sigma_{n=1}^{N}\hat{R}_n(t)-\beta\Sigma L_{n=1}^{N}\ SoC_n(t)$, in which β denotes a weight coefficient, and $SoC_n(t)$ denotes an amount of the electricity obtained by the communication node 12n in the t-th time block. Details regarding β and $SoC_n(t)$ presented in the embodiment of the disclosure may be found in the relevant technical literatures (e.g., "P. Shen, M. Ouyang, L. Lu, J. Li, and X. Feng, "The co-estimation of state of charge, state of health, and state of function for lithium-ion batteries in electric vehicles," IEEE Trans. Veh. Technol., vol. 67, no. 1, pp. 92-103, January 2018"), and are not further described herein.

Thereafter, in the step S330, the base station 110 may determine the communication time allocation (i.e., $\tau(t)$) corresponding to the t-th time block according to an objective function associated with the total estimated throughput (i.e., $\hat{R}(t)$).

For example, according to an embodiment, the objective function includes $$\max_{\tau(t)} \hat{R}(t),$$

(i.e., maximization of $\hat{R}(t)$), and limitation conditions thereof include $\tau_H(t)+\tau_T(t)=1$, $\tau_H(t)\geq 0$, $\tau_T(t)\geq 0$, and $\tau_n(t)\geq 0$. However, the disclosure is not limited to the above.

According to other embodiments, the objective function and the limitation conditions may be adjusted based upon needs of the designer. For example, the conventional WPCN literatures do not consider the transmission fairness among the communication nodes 121-12N. However, if the transmission fairness is not considered in a WPCN with multiple communication nodes, the communication node farther from the base station 110 will obtain less transmission time than the other closer communication nodes. As a result, the throughput of the farther communication node will be significantly less than the other closer communication nodes.

Therefore, according to some embodiments, the limitation conditions may further include $\hat{R}_n(t)\geq\overline{R}_n$, in which $\overline{R}_n$ denotes a lower throughput limit of the communication node 12n. As such, the $\tau(t)$ obtained by the base station 110 may further consider and guarantee the transmission fairness among the communication nodes 121-12N. However, the disclosure is not limited to the above.

According the embodiment of the disclosure, $\tau(t)$ obtained by the step S330 may be understood as the optimal communication time allocation which satisfies the limitation conditions and maximizes $\hat{R}(t)$. For ease of explanation, $\tau^*(t)$ denotes $\tau(t)$ obtained by the step S330 hereafter. However, the disclosure is not limited to the above.

In addition, in some embodiments, in order to avoid the obtained $\tau(t)$ from overfitting or falling into a local optimal solution, before performing the step S330, the base station 110 may further decide according to an ε-greedy policy whether to determine the communication time allocation (i.e., $\tau(t)$) corresponding to the t-th time block according to the objective function associated with the total estimated throughput (i.e., $\hat{R}(t)$). If so, the base station 110 may determine the communication time allocation corresponding to the t-th time block according to the objective function associated with the total estimated throughput. If not, the base station 110 may stochastically generate the communication time intervals of each of the base station 110 and the communication nodes 121-12N in the t-th time block, so as to determine the communication time allocation corresponding to the t-th time block. In addition, the communication time allocation satisfies the limitation conditions.

In short, the base station 110 may decide whether to perform the step S330 according to the ε-greedy policy. Specifically, if the ε-greedy policy is adopted, the base station 110 has the probability of £ (e.g., a minimum value) of not performing the step S330 and stochastically determining $\tau(t)$ instead, but the determined $\tau(t)$ still has to satisfy the set limitation conditions). Accordingly, the base station 110 has the probability of 1-ε of performing the step S330 to determine $\tau(t)$ (i.e., the previously mentioned $\tau^*(t)$). In this way, the obtained $\tau(t)$ may be prevented from overfitting or falling into the local optimal solution. However, the disclosure is not limited to the above.

In addition, according to an embodiment, the base station 110 may also determine $\tau(1)$ based upon the above-mentioned stochastic method when t is equal to 1, and may determine $\tau(t)$ according to the above teaching when t is greater than 1. However, the disclosure is not limited to the above.

Thereafter, in the step S340, the base station 110 may notify the communication nodes 121-12N of the communication time allocation (i.e., $\tau(t)=[\tau_H(t)\ \tau_1(t)\ \ldots\ \tau_N(t)]$) of the t-th time block, and request each of the communication nodes 121-12N to perform a specific communication behavior according to the corresponding communication time interval in the t-th time block (such as obtaining energy from the base station 110 or sending data to the base station 110).

Next, in the step S350, the base station 110 may obtain an actual throughput of each of the communication nodes 121-12N in the t-th time block. That is, the base station 100 may practically measure the amounts of data sent by each of the communication nodes 121-12N in the allocated communication time intervals (i.e., $\tau_1(t)$-$\tau_N(t)$). For ease of explanation, the actual throughput of the communication node 12n in the t-th time block may be denoted as $R_n(t)$.

Thereafter, in the step S360, the base station 110 may generate the weight vector of each of the communication nodes 121-12N in a (t+1)-th time block according to the actual throughput, the weight vector and the estimated throughput of each of the communication nodes 121-12N in the t-th time block.

According to an embodiment, the base station 110 may perform a stochastic gradient descent (SGD) method according to the actual throughput, the weight vector and the estimated throughput of each of the communication nodes 121-12N in the t-th time block, so as to generate the weight vector of each of the communication nodes 121-12n in the (t+1)-th time block.

For example, the weight vector of the communication node 12n in the (t+1)-th time block may be denoted as $w_n(t+1)$. According to an embodiment, $w_n(t+1)$ may be characterized as:

$$w_n(t+1) = w_n(t) + \frac{1}{2}\alpha\nabla(R_n(t) - \hat{R}_n(t))^2$$

$$= w_n(t) + \frac{1}{2}\alpha\nabla(R_n(t) - \hat{R}_n(\tau_H(t), \tau_N(t), w_n(t)))^2$$

$$= w_n(t) + \alpha[R_n(t) - \hat{R}_n(\tau_H(t), \tau_N(t), w_n(t))]x_n(t),$$

in which $\alpha$ is a step size value, and $\nabla(\bullet)$ is a gradient operator.

According to an embodiment, after the $w_n(t+1)$ is obtained, the base station 110 may further determine the communication time allocation (i.e., $\tau(t+1)$) in the (t+1)-th time block according to the above teaching, and accordingly request each of the communication nodes 121-12N to perform the specific communication behavior in the (t+1)-th time block according to the corresponding communication time interval. After that, the base station 110 may also obtain the actual throughput of each of the communication nodes 121-12N in the (t+1)-th time block, and correspondingly generate the weight vector of each of the communication nodes 121-12N in the (t+2)-th time block. For related details, please referee to the descriptions in the above embodiments, and details are not further described herein.

Experimental results show that the value of $E[(R_n(t)-\hat{R}_n(\tau_H(t), \tau_N(t), w_n(t)))^2]$ (i.e., the mean square error (MSE) of $R(t)$ and $\hat{R}_n(t)$) will decrease with the increase of t. That is, as time goes by, $\tau(t)$ determined by the method of the disclosure allows the actual throughput of the communication node 12n (i.e., $R_n(t)$) gradually approaches the estimated throughput of the communication node 12n (i.e., $\hat{R}_n(t)=w_n(t)x_n^T(t)$).

To sum up, in the method and base station proposed by the disclosure, it is not necessary to convert the WPCN optimization problem into convex problem; in addition, the optimal time allocation in each time block may be obtained while the models are unknown. In addition, the method and base station proposed by the disclosure may be widely employed in various WPCN system architectures. Moreover, by properly introducing the lower throughput limit of each of the communication nodes in the limitation conditions, the $\tau(t)$ determined by the method of the disclosure may guarantee the transmission fairness among the communication nodes, so as to avoid the situation that the data transmission excessively concentrates in the communication nodes closer to the base station. In addition, by introducing the electricity-related parameters (i.e., $\beta\Sigma_{n=1}^{N}SoC_n(t)$) into the model of the total estimated throughput of the communication nodes, $\tau(t)$ determined by the method of the disclosure may further consider the battery lives of each of the communication nodes.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A communication time allocation method using reinforcement learning for a base station of a wireless powered communication network, the base station managing a plurality of communication nodes of the wireless powered communication network, the communication time allocation method comprising:
   obtaining a weight vector of each of the plurality of communication nodes in a t-th time block, and modelling an eigenvector of each of the plurality of communication nodes in the t-th time block, wherein the eigenvector of each of the plurality of communication nodes in the t-th time block is associated with a communication time interval of each of the plurality of communication nodes in the t-th time block;
   modelling an estimated throughput of each of the plurality of communication nodes in the t-th time block according to the weight vector and the eigenvector of each of the plurality of communication nodes in the t-th time block, and accordingly modelling a total estimated throughput of the plurality of communication nodes in the t-th time block;
   determining a communication time allocation corresponding to the t-th time block according to an objective function associated with the total estimated throughput, wherein the communication time allocation comprises the communication time intervals of each of the base station and the plurality of communication nodes in the t-th time block, and the communication time allocation satisfies at least one limitation condition;
   notifying the plurality of communication nodes of the communication time allocation of the t-th time block, and requesting each of the plurality of communication nodes to perform a specific communication behavior according to the corresponding communication time interval in the t-th time block;
   obtaining an actual throughput of each of the plurality of communication nodes in the t-th time block; and
   generating the weight vector of each of the plurality of communication nodes in a (t+1)-th time block according to the actual throughput, the weight vector and the estimated throughput of each of the plurality of communication nodes in the t-th time block.

2. The communication time allocation method according to claim 1, wherein the communication time allocation is characterized by $\tau(t)=[\tau_H(t)\tau_N(t) \ldots \tau_N(t)]$, wherein $\tau_H(t)$ denotes the communication time interval of the base station in the t-th time block, $\tau_n(t)$ denotes the communication time interval of an n-th one of the plurality of communication nodes in the t-th time block, and the total estimated throughput is characterized as $\hat{R}(t)$, the objective function includes $$\max_{\tau(t)} \hat{R}(t),$$

and the at least one limitation condition comprises:

$\tau_H(t)+\tau_T(t)=1$ $\tau_H(t)\geq 0, \tau_T(t)\geq 0,$ $\tau_n(t)\geq 0,$ wherein $\tau_T(t)$ denotes a total transmission time occupied by the plurality of communication nodes in the t-th time block.

3. The communication time allocation method according to claim 2, wherein the at least one limitation condition further comprises $\hat{R}_n(t)\geq \overline{R}_n$, wherein $\hat{R}_n(t)$ denotes the estimated throughput of the n-th communication node in the t-th time block, and $\overline{R}_n$ denotes a lower throughput limit of the n-th communication node.

4. The communication time allocation method according to claim 2, wherein the weight vector, the eigenvector and the estimated throughput of the n-th communication node in the t-th time block are respectively characterized as $w_n(t)$, $x_n(t)$, and $\hat{R}_n(t)$, and $\hat{R}_n(t)=w_n(t)x_n^T(t)$.

5. The communication time allocation method according to claim 4, where the total estimated throughput of the plurality of communication nodes in the t-th time block is characterized as $\hat{R}(t)$, and $\hat{R}(t)=\Sigma_{n=1}^{N}\hat{R}_n(t)$, wherein N denotes a total number of the plurality of communication nodes.

6. The communication time allocation method according to claim 5, wherein:

$w_n(t)=[w_{n,1}(t)w_{n,2}(t) \ldots w_{n,D}];$ $x_n(t)=[x_1(\tau_H(t),\tau_n(t)) \ldots x_D(\tau_H(t),\tau_n(t))];$ $\hat{R}_n(t)=\hat{R}_n\tau_H(t),\tau_n(t),w_n(t))=\Sigma_{d=1}w_{n,d}(t)x_d(\tau_H(t),\tau_n(t)),$ wherein D denotes a dimension of $w_n(t)$ and $x_n(t)$.

7. The communication time allocation method according to claim 4, wherein the total estimated throughput of the plurality of communication nodes in the t-th time block is characterized as $\hat{R}(t)$, and $\hat{R}(t)=\Sigma_{=1}\hat{R}_n(t)-\beta\Sigma_{n=1}^{N}SoC_n(t)$, wherein N denotes a total number of the plurality of communication nodes, $\beta$ denotes a weight coefficient, and $SoC_n(t)$ denotes an amount of electricity obtained by the n-th communication node in the t-th time block.

8. The communication time allocation method according to claim 1, wherein the base station transfers energy to at least one of the plurality of communication nodes in the corresponding communication time interval in the t-th time block.

9. The communication time allocation method according to claim 1, wherein the specific communication behaviour comprises transmitting data to the base station.

10. The communication time allocation method according to claim 1, wherein the step of generating the weight vector of each of the plurality of communication nodes in the (t+1)-th time block according to the actual throughput, the weight vector and the estimated throughput of each of the plurality of communication nodes in the t-th time block comprises:

performing a stochastic gradient descent method according to the actual throughput, the weight vector and the estimated throughput of each of the plurality of communication nodes in the t-th time block to generate the weight vector of each of the plurality of communication nodes in the (t+1)-th time block.

11. The communication time allocation method according to claim 10, wherein the actual throughput, the weight vector, and the estimated throughput of the n-th communication node of the plurality of communication nodes in the t-th time block are respectively characterized as $R_n(t)$, $w_n(t)$ and $\hat{R}_n(t)$, the weight vector of the n-th communication node in the (t+1)-th time block is characterized as $w_n(t+1)$, wherein $$w_n(t+1) = w_n(t) + \frac{1}{2}\alpha\nabla\left(R_n(t) - \hat{R}_n(t)\right)^2,$$

$\alpha$ denotes a step size value, and $\nabla(\bullet)$ denotes a gradient operator.

12. The communication time allocation method according to claim 1, wherein before the step of determining the communication time allocation corresponding to the t-th time block according to the objective function associated with the total estimated throughput, the communication time allocation method further comprises:

according to a $\varepsilon$-greedy policy, deciding whether to determine the communication time allocation corresponding to the t-th time block according to the objective function associated with the total estimated throughput;

if so, determining the communication time allocation corresponding to the t-th time block according to the objective function associated with the total estimated throughput;

if not, stochastically generating the communication time intervals of each of the base station and the plurality of communication nodes in the t-th time block to determine the communication time allocation corresponding to the t-th time block, wherein the communication time allocation satisfies the at least one limitation condition.

13. The communication time allocation method according to claim 1, wherein t is greater than 1.

14. The communication time allocation method according to claim 1, if t is equal to 1, further comprising stochastically generating the communication time intervals of each of the base station and the plurality of communication nodes in the t-th time block, wherein the communication time allocation satisfies the at least one limitation condition.

15. A base station belonging to a wireless powered communication network and managing a plurality of communication nodes of the wireless powered communication network, wherein the base station is configured to:

obtain a weight vector of each of the plurality of communication nodes in a t-th time block, and model an eigenvector of each of the plurality of communication nodes in the t-th time block, wherein the eigenvector of each of the plurality of communication nodes in the t-th time block is associated with a communication time interval of each of the plurality of communication nodes in the t-th time block;

model an estimated throughput of each of the plurality of communication nodes in the t-th time block according to the weight vector and the eigenvector of each of the plurality of communication nodes in the t-th time block, and accordingly model a total estimated throughput of the plurality of communication nodes in the t-th time block;

determine a communication time allocation corresponding to the t-th time block according to an objective function associated with the total estimated throughput, wherein the communication time allocation comprises the communication time intervals of each of the base station and the plurality of communication nodes in the t-th time block, and the communication time allocation satisfies at least one limitation condition;

notify the plurality of communication nodes of the communication time allocation of the t-th time block, and request each of the plurality communication nodes to perform a specific communication behavior according to the corresponding communication time interval in the t-th time block;

obtain an actual throughput of each of the plurality of communication nodes in the t-th time block; and generate the weight vector of each of the plurality of communication nodes in a (t+1)-th time block according to the actual throughput, the weight vector and the estimated throughput of each of the plurality of communication nodes in the t-th time block.

* * * * *